US006937808B2

(12) United States Patent
Kawase et al.

(10) Patent No.: US 6,937,808 B2
(45) Date of Patent: Aug. 30, 2005

(54) OPTICAL INTERCONNECTION APPARATUS

(75) Inventors: Ritsu Kawase, Shizuoka (JP); Kyoichi Sasaki, Shizuoka (JP); Masayoshi Suzuki, Shizuoka (JP); Tatsushi Kobayashi, Shizuoka (JP); Ryo Nagase, Tokyo (JP); Mamoru Hirayama, Tokyo (JP)

(73) Assignees: Tomoegawa Paper Co., Ltd., Tokyo (JP); Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 10/424,981

(22) Filed: Apr. 29, 2003

(65) Prior Publication Data

US 2004/0013392 A1 Jan. 22, 2004

(30) Foreign Application Priority Data

May 2, 2002 (JP) .................................. 2002-130254

(51) Int. Cl.[7] .............................................. G02B 6/00
(52) U.S. Cl. ...................................................... 385/137
(58) Field of Search ........................................... 385/137

(56) References Cited

U.S. PATENT DOCUMENTS

| 4,355,865 A | 10/1982 | Conrad et al. |
| 4,360,384 A | 11/1982 | McKaveney et al. |
| 5,292,390 A | 3/1994 | Burack et al. |
| 5,970,191 A | 10/1999 | Oba et al. |
| 6,011,887 A | 1/2000 | Kamei et al. |
| 6,075,911 A | 6/2000 | Goto |
| 6,195,495 B1 * | 2/2001 | Ota et al. ............... 385/137 |
| 6,350,397 B1 | 2/2002 | Heikkila et al. |
| 6,547,445 B2 | 4/2003 | Kiani |
| 6,579,737 B2 | 6/2003 | Yoneda et al. |
| 6,681,068 B2 | 1/2004 | Goto et al. |
| 6,711,322 B1 | 3/2004 | Kohda et al. |
| 6,748,156 B2 * | 6/2004 | Saito et al. ............. 385/137 |

FOREIGN PATENT DOCUMENTS

| EP | 0669200 A1 | 8/1995 |
| EP | 0816882 A1 | 1/1998 |
| JP | 9-244536 A | 9/1997 |
| JP | 10-237400 A | 9/1998 |
| JP | 2574611 | 10/1998 |
| WO | 99/46821 A1 | 9/1999 |

* cited by examiner

Primary Examiner—Javaid H. Nasri
(74) Attorney, Agent, or Firm—McDermott Will & Emery LLP

(57) ABSTRACT

An optical interconnection apparatus which is very easy to handle and does not cause excessive bending and breakage of the optical fibers when connecting with other optical apparatus is provided. The optical interconnection apparatus includes a base sheet and plural optical fibers two-dimensionally routed on the base sheet via an adhesive layer. The optical fibers form a routing pattern having at least a straight part, a crossing part, a curved part or a fiber pitch changing part. The apparatus further includes another base sheet this is adhered on the said routed optical fibers. The two base sheets have a different sizes so that one of the base sheets does not exist in the vicinity of the edge of the other base sheet at which the optical fibers are outwardly extended.

8 Claims, 1 Drawing Sheet

OPTICAL INTERCONNECTION APPARATUS

BACKGROUND OF THE INVENTION

1. Field of the Invention

This invention relates to optical interconnection apparatus (optical circuit board) for mutually connecting optical components, parts and/or devices used in optical communications or optical information processing, such as optical components, optical circuit packages and optical circuit devices.

2. Description of the Background Art

To permit optical interconnections between plural optical components in an optical circuit package or optical interconnections between plural optical circuit packages or between optical circuit devices on each of which optical packages are mounted, these optical components, optical circuit packages and optical circuit devices are provided at terminals thereof with optical connectors to interconnect them together via optical fibers. As these optical fibers have to be arranged with a surplus in length in this case, it is a current circumstance that, on an optical circuit package or inside and/or on a back side of an optical circuit devices, intricately routed lines of the optical fibers extend overlapping one another in the form like bird's nest and hence occupy a large space. For an optical interconnection process which requires a large space and considerable interconnecting labor due to such complex routing, a simple process has been proposed to solve these problems by routing optical fibers on a two-dimensional planar surface as desired. As disclosed in JP 2,574,611 B, for example, an optical interconnection apparatus which uses a sheet or base with a pressure-sensitive adhesive coated thereon to hold optical fibers in place has been proposed.

The optical interconnection apparatus disclosed in JP 2,574,611 B is obtained in such a way that upon its fabrication, optical fibers are routed by a pressure-sensitive adhesive, which is coated on a substrate (base layer) or a fiber jacket to form a routing pattern and the routing pattern is then covered with the same material with the same size as the material used for the substrate, whereby a protective layer (covering layer) is formed. This process is however accompanied by problems in that optical fibers outwardly extended from the substrate become easy to bend extremely at the edges of the substrate to cause breakage of the optical fibers or increase transmission loss, because the routed optical fibers outwardly extended at the edges of the substrate are sandwiched with two substrates so that flexibility of the optical interconnection apparatus is uniform over the whole area and stiffness thereof becomes much larger than that of optical fibers. Therefore, there are big problems in handling and reliability.

SUMMARY OF THE INVENTION

The present invention has been completed with a view to resolving various problems of the conventional art such as those described above. Described specifically, it is an object of the present invention to enhance reliability of the optical interconnection apparatus having plural optical fibers routed on a substrate by preventing breakage of the optical fibers by bending upon handling it and preventing optical loss by steep increase of bending caused by change of environment. Accordingly, the object of the present invention is to provide an optical interconnection apparatus having plural optical fibers routed on a substrate which is easily fabricated and excellent in handling and reliability.

An optical interconnection apparatus according to the present invention comprises a base sheet, plural optical fibers two-dimensionally routed on said base sheet via an adhesive layer so as to form a routing pattern having at least a straight part, a crossing part, a curved part or a fiber pitch changing part, and another base sheet adhered on said routed optical fibers, wherein said two base sheets have each a different size and one of said base sheets does not exist in the vicinity of the edge of the other base sheet at which the optical fibers are outwardly extended.

In the optical interconnection apparatus according to the present invention, it is preferred that the base sheet with larger size of said two base sheets has flexibility equal to or larger than that of the other base sheet. It is further preferred that the base sheet with larger size of said two base sheets is made of a rubber-like material or foam material having elasticity and the other base sheet is made of a plastic material.

In the optical interconnection apparatus according to the present invention, the optical fibers routed on the portion where one of the base sheets does not exist are covered with a resin material having flexibility. As the resin material having flexibility, it is possible to use a gel-like material or rubber-like material, or a thermosetting resin or UV light curing resin having flexibility.

DETAILED DESCRIPTION OF THE PREFERRED EMBODIMENTS

Figure 1:
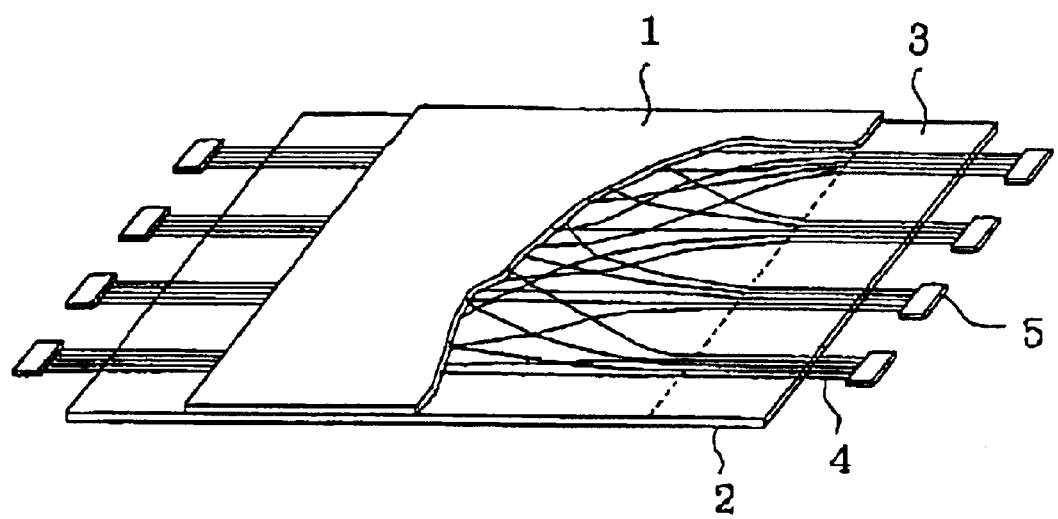
FIG. 1 is an oblique view of an optical interconnection apparatus according to the present invention.

Referring to the drawings, embodiments of the present invention will hereinafter be described in detail.

Figure 2:
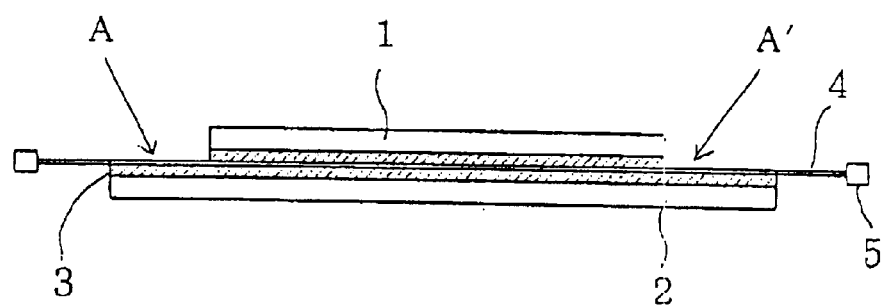
FIG. 2 is an illustrative cross-sectional view of the optical interconnection apparatus of FIG. 1.

In FIG. 1 and FIG. 2, plural optical fibers 4 are two-dimensionally routed via an adhesive layer 3 provided on one side of the base sheet 2 having a two-dimensional plane. These optical fibers 4 are sandwiched between the base sheet 2 and the other base sheet 1, and both the base sheets 1 and 2 are adhered via an adhesive layer 3 in a body, whereby said optical fibers are fixed and protected by these base sheets. Both opposite ends of the optical fibers 4 are formed into end portions 5 adapted to permit optical interconnections. In this optical interconnection apparatus, the size of the base sheet 2 is different from that of the base sheet 1. Only the base sheet 2 exists in the vicinities A and A' of the edges at which the optical fibers are outwardly extended. Accordingly, in this optical interconnection apparatus, the vicinity of the edge at which the optical fibers are outwardly extended is excellent in flexibility and more flexible as compared with the main body of the optical interconnection apparatus. Therefore, the outwardly extended optical fibers 4 are protected to external force such as bending, etc.

Figure 3:
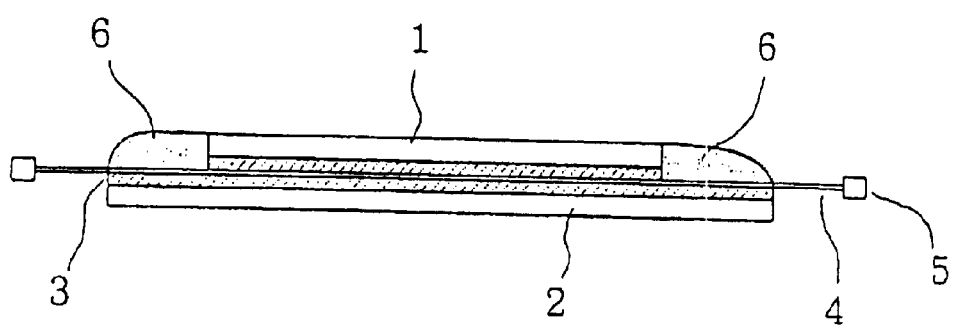
FIG. 3 is an illustrative cross-sectional view of another example of the optical interconnection apparatus according to the present invention.

In the optical interconnection apparatus of FIG. 3, the optical fibers in the portion where the one of the base sheet does not exist as shown in FIG. 2, namely, the optical fibers 4 routed in the vicinities of the edges of the base sheet 2 at which the optical fibers are outwardly extended, are covered with an flexible resin material 6 which is more flexible than the base sheet 1. Thereby, the optical fibers 4 are protected and fixed so that they are much more difficult to be damaged by external force, such as bending.

In the optical interconnection apparatus according to the present invention, no particular limitation is imposed on the base sheets 1 and 2 insofar as they have a two-dimensional plane and are flexible. Illustrative of the base sheets can include glass-epoxy resin composite substrates, polyester films, polyethylene films, polyimide films, and gels, rubbers or foams of organic materials such as silicone or urethane resin. Any base sheet is usable insofar as it is employed in general electronic parts or electric parts.

In the optical interconnection apparatus according to the present invention, the flexibility is excellent in the direction of the outwardly extended optical fibers and thus the optical fibers outwardly extended from the edges become to have good characteristics against bending, because the base sheets exist in both sides of the main body while only one base sheet exists in the vicinity of the edge at which the optical fibers are outwardly extended. It is preferred that the flexibility of the base sheet 2 is larger than that of the base sheet 1. Specifically, the rubber-like materials, form materials, or gel-like materials that have elasticity are usable. More specifically, silicone rubbers, urethane rubbers, fluorinated rubbers, acrylic rubbers, ethylene-acrylic rubbers, SBR, BR, NBR, chloroprene rubbers and the like can be mentioned as rubber-like materials. As the foam materials, polystyrene, polyvinyl chloride, polyurethane, phenol resin, urea resin, epoxy resin, polyethylene, polypropylene, methacrylic resin, silicone resin and the like can be mentioned, and as the gel-like materials, silicone gels, acrylic resin gels, fluorinated resin gels and the like can be mentioned.

In the present invention, no particular limitation is imposed on the thickness of the base sheet 1 and that of the base sheet 2, if the base sheet can support the routed optical fibers, and thus the thickness can be suitably chosen depending upon the application purpose thereof. In the present invention, the base sheet 1 and the base sheet 2 are necessary to have each a different size so that only the base sheet 2 exists in the vicinity of the edges at which the optical fibers are outwardly extended. Although the size of both base sheets can be suitably selected depending on the application purpose of the optical interconnection apparatus, it is necessary that the size (length) of both base sheets is different in the direction of outwardly extended optical fibers. In general, it is preferred that only the base sheet 2 exists in the area of 2–20 mm, preferably 3–10 mm distant from the edge of the base sheet 1.

Optical fibers, which are to be routed in the present invention, can be suitably selected and used depending on the application purpose of the optical interconnection apparatus. For example, silica-made or plastic-made single-mode optical fibers, multiple-mode optical fibers or the like can be used preferably. The optical fibers may be provided with protection tubes or sheaths of such as polyethylene in order to protect the outwardly extended optical fibers. Moreover, fire resistance may be given for the protection tubes and sheaths.

In the present invention, it is necessary that at least one of the above-mentioned base sheets is provided with an adhesive layer for routing the optical fibers. As an adhesive forming the adhesive layer, any adhesive can be used insofar as it has adhesiveness sufficient to retain the pattern of the optical fibers against tensions which may be produced when the routed optical fibers are bent. Usable examples can include various pressure-sensitive adhesives, thermoplastic adhesives and thermosetting adhesives, such as polyurethane adhesives, acrylic adhesives, epoxy adhesives, nylon-base adhesives, phenol adhesives, polyimide adhesives, vinyl-base adhesives, silicone adhesives, rubber-base adhesives, fluorinated epoxy adhesives and fluorinated acrylic adhesives. From the standpoint of ease in routing optical fibers, pressure-sensitive adhesives and thermoplastic adhesives are used preferably.

In the optical interconnection apparatus shown in FIG. 3, as the resin material 6 for protecting and fixing the optical fibers routed in the vicinity of the edge of the base sheet at which the optical fibers are outwardly extended, resin materials having flexibility are preferred to use in order to reduce the stiffness of the base sheets and improve bending characteristics of the outwardly extended optical fibers. Specifically, gel-like or rubber-like resin materials, curing resin having flexibility such as thermosetting resin, UV light curing resins, electron beam curing resins and the like, and thermoplastic resins having flexibility can be used.

More specifically, silicone gels, acrylic resin gels, fluorinated resin gels and the like can be mentioned as the gel-like resin materials. As the rubber-like organic materials, silicone rubbers, urethane rubbers, fluorinated rubbers, acrylic rubbers, ethylene-acrylic rubbers, SBR, BR, NBR, chloroprene rubbers and the like can be mentioned. As the curing resins having flexibility, epoxy resins, UV light curing resins, silicone resins and the like can be mentioned. As the thermoplastic resins, any resin can be used if it has flexibility. For example, resins making up hot-melt adhesives, such as polyvinyl acetate, acrylic resins such as polyethyl methacrylate, etc., vinylidene chloride resins, polyvinyl butyral and polyamide can be mentioned.

Furthermore, a hard-coated layer composed of silicone resin, epoxy resin, urethane resin or acrylic resin may be formed on the optical fibers routed in the vicinity of the edge of the base sheet at which the optical fibers are outwardly extended.

In the optical interconnection apparatus according to the present invention, the optical fibers extend out from desired positions (ports) on end faces of the optical interconnection apparatus so that end portions are formed. Optical connectors are attached on the end portions, or the end portions are arc-fusion-spliced with optical fibers with optical connectors. No particular limitation is imposed on the optical connectors in the optical interconnection apparatus according to the present invention, but optical single-fiber or multiple-fiber small connectors can be chosen suitably. Examples can include MPO optical connectors, MT optical connectors, MU optical connectors, and FPC optical connectors [NTT R&D, Vol.45, No.6 p589] and V-grooved parts for optical interconnection. No particular limitation is also imposed on the method of connecting the optical connectors.

The above-mentioned optical interconnection apparatus according to the present invention can be fabricated by the following process. First, an adhesive layer is provided on one side of a sheet having a two-dimensional plane to produce the first base sheet with an adhesive layer. Optical fibers are then routed in a desired pattern on the above-mentioned adhesive layer. At this time, the both opposite ends of the optical fibers are located extending out from the base sheet such that they can be adapted as end portions for interconnections with optical connectors or the like. As a process for forming the adhesive layer, it is possible to adopt a process, in which the adhesive layer is formed by coating an adhesive, either in a state as it is or in the solution of the adhesive, on the base sheet using a method such as roll coating, bar coating, blade coating, casting, dispenser coating, spray coating or screen coating. Another process is that an adhesive sheet with the adhesive layer formed in advance on a release film is laminated on the base sheet and the release film is then removed.

For the adhesive layer, a suitable thickness can be chosen depending on the diameter of optical fibers to be routed. Its thickness is set generally in a range of from 1 μm to 1 mm, preferably from 5 to 500 μm, more preferably from 10 to 300 μm.

In the present invention, a suitable method may be selected for the routing of optical fibers depending on the application purpose. It is only necessary to route optical fibers such that they form a routing pattern having at least a straight part, a crossing part, a curved part or a fiber pitch changing part and they are provided at both ends thereof with end portions adapted to permit interconnections. For example, it is possible to route optical fibers by arranging projecting members, recessed members or the like on a base sheet or by providing outer surface of the optical fibers with adhesive layers.

Next, a second base sheet is adhered to the above-mentioned base sheet on which optical fibers are routed, thereby the optical interconnection apparatus according to the present invention being produced. The second base sheet may have an adhesive layer like the above-mentioned base sheet or may not have the adhesive layer. The first and the second base sheets may be composed of the same material or different material each other.

When the optical fibers routed in the vicinity of the edge of the base sheet at which the optical fibers are outwardly extended are protected and fixed by the resin material, a suitable protecting and fixing method may be chosen depending on the application purpose. For example, it is possible to use a method which comprises preparing a coating solution of the resin material dissolved in a suitable solvent, dropping the coating solution on the routed optical fibers and drying, a method which comprises dropping a liquid thermosetting resin on the routed optical fibers and hardening with heat, a method which comprises dropping a thermosetting resin fused with heat on the routed optical fibers and solidifying by cooling, and a method which comprises dropping an anaerobic hardening or moisture hardening resin on the routed optical fibers and solidifying it under an anaerobic atmosphere or by moistening. In these cases, the resin material may be covered on only portions (ports) in which optical fibers exist, or may be covered on the whole surface of the portion where one base sheet does not exist.

In the optical interconnection apparatus according to the present invention fabricated as described above, optical components such as optical connectors or optical modules are interconnected to the outwardly extended end portions of the optical fibers. For example, the end portions of the optical fibers, said end portions having been subjected to endface treatment for optical connection, are interconnected to the optical connectors, or are interconnected to the optical fibers provided with optical connectors using arc-fusion-splicing.

Effect of the Invention

In the optical interconnection apparatus according to the present invention, since both sides of the main body are covered with the base sheets, the handling in the work is very easy. Moreover, flexibility gradually changes from the main body of the optical interconnection apparatus over the ports thereof, because there is only one base sheet in the ports at which optical fibers were outwardly extended. Accordingly, the outwardly extended optical fibers can be easily connected with other optical apparatus without causing excessive bending and breakage of the optical fibers, because excessive force is not applied to the outwardly extended optical fibers. Thus the workability in connection is improved.

Furthermore, when two base sheets different in flexibility each other are used in the interconnection apparatus and the sheet with larger flexibility is used for the portions at which the optical fibers are outwardly extended (ports), or when the optical fibers routed in the ports located in the vicinity of the edge of the base sheet are covered with a resin having flexibility, workability and reliability of the optical interconnection apparatus can be further improved.

EXAMPLES

The present invention will hereinafter be described by examples, but the present invention shall not be limited to them.

Example 1

On a polyimide film of 125 μm in thickness (size: 100 mm×120 mm) as the base sheet, a pressure-sensitive acrylic adhesive was applied so as to form a pressure-sensitive acrylic adhesive layer of 100 μm in thickness. On the formed adhesive layer, optical fibers (product of Furukawa Electric Co., Ltd.; 250 μm in diameter) were routed to each port (an exit of optical fibers from an optical interconnection apparatus) as will be described next. Namely, optical fibers were arranged in parallel with each other at pitches of 300 μm, and 4 ports (each port was formed of 4 optical fibers) were formed at pitches of 25 mm on each of opposite sides, i.e., shorter sides of the polyimide film. Each optical fiber was routed extending from one of the shorter sides of the adhesive sheet to the other shorter side. The routing to the individual ports on the opposite sides was designed to provide each of the optical fibers with desired free-access routing (16 fibers), and the routing of the optical fibers was adjusted to limit the maximum overlapped number of optical fibers at 2 fibers.

Next, on a polyimide film of 125 μm in thickness (size: 100 mm×100 mm) was formed a pressure-sensitive acrylic adhesive layer of 100 μm in thickness. This polyimide film was adhered to the above-mentioned base sheet on which the optical fibers were routed so as to face each pressure-sensitive layer. In this case, adhesion was carried out such a manner that the base sheet on which the optical fibers were routed was exposed 10 mm each from both edges about the ports from which the optical fibers were outwardly extended.

Thereafter, a 50% toluene solution of a silicone-base surface treatment agent (product of Toshiba Silicone Co., Ltd.; HS-3/XC9603/YC6831=10/2.5/0.3 (parts by weight)) was applied on the optical fibers of 10 mm part from the edges in each port to form surface protective layers of 10 μm in thickness after drying. Thus, an optical interconnection apparatus was produced. 4-Core MT connectors were then attached to the optical interconnection apparatus to obtain an optical circuit board as a final product.

The resultant optical circuit board was easily handled so that the workability was improved, because both sides of the main body were covered with the polyimide film. Moreover, flexibility gradually changed from the main body over the ports from which optical fibers were outwardly extended, because only the polyimide film existed in the ports. Accordingly, the outwardly extended optical fibers could be easily connected with other optical apparatus without causing excessive bending and breakage in the outwardly extended optical fibers, since excessive force was not applied to the outwardly extended optical fibers. The workability in connection was therefore improved.

A loss of all the interconnected optical fibers was measured. It was found to be 0.4 dB or less including losses due to the interconnections with the optical connectors. Further, with respect to optical circuit boards so fabricated, there were conducted a damp heat test (the board was left over for 5,000 hours at 85° C. and 85% RH) and a heat cyclic test (−40° C. to 75° C., 500 cycles). Variations and fluctuations in optical loss were both 0.1 dB or less. The optical circuit boards were therefore found to be satisfactorily usable as optical interconnection apparatus.

Example 2

Optical fibers were routed on a base sheet made of a silicone rubber by the same manner as in Example 1 except that a rubber sheet of 1 mm in thickness which was prepared by applying a silicone rubber coating (product of Toshiba Silicone Co. Ltd.; "TSE-399") and drying at 25° C. for 24 hours was used as the base sheet instead of the polyimide film in Example 1.

Next, on a polyimide film of 125 $\mu$m in thickness (size: 100 mm×100 mm) was formed a pressure-sensitive acrylic adhesive layer of 100 $\mu$m in thickness. This polyimide film was adhered to the above-mentioned rubber-like base sheet on which the optical fibers were routed so as to face each pressure-sensitive layer. In this case, adhesion was carried out such a manner that the base sheet on which the optical fibers were routed was exposed 10 mm each from both edges about the ports from which the optical fibers were outwardly extended.

Thereafter, an UV light curable adhesive (product of Osaka Organic Chemical Ind. Co. Ltd.; Piscotack PM-654) was applied on the optical fibers in each port of the rubber-like base sheet, followed by exposing to ultraviolet rays at 20 mW/cm$^2$ for 2 minutes to form protective resin layers of 125 $\mu$m in thickness. Thus, an optical interconnection apparatus was produced. 4-Core MT connectors were then attached to the optical interconnection apparatus to obtain an optical circuit board as a final product.

The resultant optical circuit board was easily handled so that the workability was improved, because both sides of the main body were covered with the silicone rubber film and the polyimide film, respectively. Moreover, flexibility gradually changed from the main body over the ports at which optical fibers were outwardly extended, because the polyimide film did not exist in the ports and there was only the silicone rubber film in the ports. Accordingly, the outwardly extended optical fibers could be easily connected with other optical apparatus without causing excessive bending and breakage in the outwardly extended optical fibers, since the optical fibers routed in the ports of the base sheet were protected with the UV light curing resin and excessive force was not applied to the outwardly extended optical fibers. The workability in connection was therefore improved.

A loss of all the interconnected optical fibers was measured. It was found to be 0.6 dB or less including losses due to the interconnections with the optical connectors. Further, with respect to optical circuit boards so fabricated, there were conducted a damp heat test (the board was left over for 5,000 hours at 85° C. and 85% RH) and a heat cyclic test (−40° C. to 75° C., 500 cycles). Variations and fluctuations in optical loss were both 0.1 dB or less. The optical circuit boards were therefore found to be satisfactorily usable as optical interconnection apparatus.

Example 3

Optical fibers were routed on a base sheet made of a foam material by the same manner as in Example 1 except that a foam sheet of 1.5 mm in thickness which was prepared by using a silicone foam coating (product of Toshiba Silicone Co. Ltd.; Tosfoam 5310) was used as the base sheet instead of the polyimide film in Example 1.

Next, on a polyimide film of 125 $\mu$m in thickness (size: 100 mm×100 mm) was formed a pressure-sensitive acrylic adhesive layer of 100 $\mu$m in thickness. This polyimide film was adhered to the above-mentioned foam base sheet on which the optical fibers were routed so as to face each pressure-sensitive layer. In this case, adhesion was carried out such a manner that the base sheet on which the optical fibers were routed was exposed 10 mm each from both edges about the ports from which the optical fibers were outwardly extended.

Thereafter, a protective layer composed of a silicone resin material of 125 $\mu$m in thickness was formed using a silicone base sealing agent (product of KONISHI CO., LTD.; "BATH BOND") on the optical fibers in each port of the foam base sheet to obtain an optical interconnection apparatus. 4-Core MT connectors were then attached to the optical interconnection apparatus to obtain an optical circuit board as a final product.

The resultant optical circuit board was easily handled so that the workability was improved, because both sides of the main body were covered with the base sheet composed of silicone foam and the polyimide film, respectively. Moreover, flexibility gradually changed from the main body over the ports at which optical fibers were outwardly extended, because the polyimide film did not exist in the ports and there was only the base sheet composed of silicone foam in the ports. Accordingly, the outwardly extended optical fibers could be easily connected with other optical apparatus without causing excessive bending and breakage in the outwardly extended optical fibers, since the optical fibers routed in the ports of the base sheet were protected with the silicone base sealing agent and excessive force was not applied to the outwardly extended optical fibers. The workability in connection was therefore improved.

A loss of all the interconnected optical fibers was measured. It was found to be 0.2 dB or less including losses due to the interconnections with the optical connectors. Further, with respect to optical circuit boards so fabricated, there were conducted a damp heat test (the board was left over for 5,000 hours at 85° C. and 85% RH) and a heat cyclic test (−40° C. to 75° C., 500 cycles). Variations and fluctuations in optical loss were both 0.1 dB or less. The optical circuit boards were therefore found to be satisfactorily usable as optical interconnection apparatus.

Example 4

An optical interconnection apparatus was fabricated by the same manner as in Example 3 except that optical fibers routed in the ports were protected by a protective layer which was formed using an epoxy resin (product of Kyoei Yushi Co. Ltd.; Epolite 400E) and an equivalent amount of a hardening agent (product of Yuka Shell Co. Ltd.; Epomate B002) and hardening at 150° C. for 1 hour in stead of the silicone base sealing agent in Example 3. 4-Core MT connectors were then attached to the optical interconnection apparatus to obtain an optical circuit board as a final product.

The resultant optical circuit board was easily handled so that the workability was improved, because both sides of the main body were covered with the base sheet composed of silicone foam and the polyimide film, respectively. Moreover, flexibility gradually changed from the main body over the ports at which optical fibers were outwardly extended, because the polyimide film did not exist in the ports and there was only the base sheet composed of silicone foam in the ports. Accordingly, the outwardly extended optical fibers could be easily connected with other optical apparatus without causing excessive bending and breakage in the outwardly extended optical fibers, since the optical fibers routed in the ports of the base sheet were protected with the epoxy resin and excessive force was not applied to the outwardly extended optical fibers. The workability in connection was therefore improved.

Moreover, when the optical circuit board was installed such a manner that the foam-like base sheet was located upper side, the optical fibers outwardly extended from the edges of the base sheet did not cause excessive bending and breakage, if the outwardly extended optical fibers were pulled upwards and bent. Accordingly, handling of the outwardly extended optical fibers became very easy.

A loss of all the interconnected optical fibers was measured. It was found to be 0.3 dB or less including losses due to the interconnections with the optical connectors. Further, with respect to optical circuit boards so fabricated, there were conducted a damp heat test (the board was left over for 5,000 hours at 85° C. and 85% RH) and a heat cyclic test (−40° C. to 75° C., 500 cycles). Variations and fluctuations in optical loss were both 0.1 dB or less. The optical circuit boards were therefore found to be satisfactorily usable as optical interconnection apparatus.

What is claimed is:

1. An optical interconnection apparatus comprising a base sheet, plural optical fibers two-dimensionally routed on said base sheet via an adhesive layer so as to form a muting pattern having at least a straight part, a crossing part, a curved part or a fiber pitch changing part, and another base sheet adhered on said routed optical fibers, wherein said two base sheets comprise each a flexible material comprising a resin and have each a different size and one of said base sheets does not exist in the vicinities of opposite edges of the other base sheet at which the optical fibers are outwardly extended.

2. An optical interconnection apparatus according to claim 1, wherein the base sheet with larger size of said two base sheets has flexibility equal to or larger than that of the other base sheet.

3. An optical interconnection apparatus according to claim 1, wherein the base sheet with larger size of said two base sheets is made of a rubber-like material or foam material having elasticity and the other base sheet is made of a plastic material.

4. An optical interconnection apparatus according to claim 1, wherein the optical fibers routed on the portion where one of the base sheets does not exist are covered with a resin material having flexibility.

5. An optical interconnection apparatus according to claim 4, wherein the resin material having flexibility is a gel-like material or rubber-like material.

6. An optical interconnection apparatus according to claim 4, wherein the resin material having flexibility is a thermosetting resin or UV light curing resin.

7. An optical interconnection apparatus according to claim 4, wherein the resin material having flexibility is a sealing compound or hard-coated material of a silicone-base, epoxy-base, urethane-base or acryl-base resin.

8. An optical interconnection apparatus according to claim 1, wherein said base sheet with said optical fibers two-dimensionally routed thereon has a two-dimensional plane having no groove for routing said optical fibers.

* * * * *